US005364575A

United States Patent [19]

Doom, Sr. et al.

[11] Patent Number: 5,364,575

[45] Date of Patent: Nov. 15, 1994

[54] METHOD AND SYSTEM FOR PROCESSING SOAP AND SOAP-LIKE MATERIALS

[76] Inventors: Lewis Doom, Sr., 25 Meadow Farm Rd., East Islip, N.Y. 11730; Lewis Doom, Jr., 28 Acorn La., Stony Brook, N.Y. 11799

[21] Appl. No.: 938,866

[22] Filed: Sep. 2, 1992

[51] Int. Cl.$^5$ .......................... B29C 47/10; C11D 9/24

[52] U.S. Cl. ...................................... 264/50; 252/134; 252/370; 264/148; 264/211.11; 264/237; 264/320; 264/293; 425/205; 425/379.1; 425/382.3; 425/461

[58] Field of Search ..................... 264/176.1, 349, 245, 264/293, 148, 320, 211.11, 177.11, 50, 237; 425/205-207, 209, 382.3, 376.1, 379.1, 461; 252/134, 367, 370

[56] References Cited

U.S. PATENT DOCUMENTS

| | | | |
|---|---|---|---|
| 2,210,924 | 8/1940 | Hood | 252/134 |
| 2,343,829 | 3/1944 | Clayton | 425/207 |
| 2,398,776 | 4/1946 | Bodman | 252/134 |
| 2,494,891 | 1/1950 | Marshall | 264/148 |
| 2,832,123 | 4/1958 | Pisoni | 425/379.1 |
| 3,471,906 | 10/1969 | Henry | 425/376.1 |
| 3,481,880 | 12/1969 | Austin et al. | 264/50 |
| 3,649,545 | 3/1972 | Susuki et al. | 252/134 |
| 3,789,011 | 1/1974 | Tanaka | 252/370 |
| 4,141,947 | 2/1979 | Fischer et al. | 264/75 |
| 4,680,132 | 7/1987 | Clarke et al. | 425/206 |

FOREIGN PATENT DOCUMENTS

| | | | |
|---|---|---|---|
| 1-190800 | 8/1989 | Japan | 252/367 |

*Primary Examiner*—Jeffery Thurlow

*Attorney, Agent, or Firm*—Lieberman & Nowak

[57] ABSTRACT

A continuous flow method for processing soap involving providing soap heated to a pliable consistency, mixing the soap to homogeneity, cooling the soap, and extruding the soap is provided. Also provided is a processing system. One embodiment includes a device for heating the soap, a continuous mixer and a continuous heat exchanger connected via conduits. The conduits continuous mixer and heat exchanger may be adapted to be further inputted with additional ingredients, such as a gas. Using this method and system, low cost, high volume processing of soap is possible.

25 Claims, 3 Drawing Sheets

METHOD AND SYSTEM FOR PROCESSING SOAP AND SOAP-LIKE MATERIALS

BACKGROUND OF THE INVENTION

The subject application provides a method and system for processing soap and soap-like materials.

As anyone who has ever fallen on a bar of soap will attest, soap which sinks to the bottom of the bathtub presents an unseen safety hazard. Moreover, for underdeveloped countries and people who revel in the outdoors, floating soap offers the only satisfactory medium for bathing in a stream, lake or river. Accordingly, it is an object of subject invention to provide a means for producing floating soap and soap-like materials.

Although there has long been a need for water buoyant soaps, methods for their production have typically been limited to batch processes, progressive compacting or chemical induction of gas. The subject invention overcomes these limitations by providing a continuous flow system which affords advantages not contemplated in the past.

In the manufacture of water-buoyant soap, air is entrapped within the soap to lower its specific gravity to a value less than 1.0. To aid in understanding the objects, features and advantages of the subject invention, a brief history of floating soap will be chronicled.

An early method of producing water buoyant milled soap is described by Hood, U.S. Pat. No. 2,210,824, issued Aug. 13, 1940, the contents of which are herein incorporated by reference. In this method, air introduced into a batch of soap is expanded under vacuum (by the withdrawing a piston in a hermetically sealed container), thus creating a soap that is lighter than water.

Westerberg, U.S. Pat. No. 2,360,920, issued Oct. 24, 1944, the contents of which are herein incorporated by reference, teaches a batch method of making soap which is light, airy and suitable for single use. To obtain such an article, a soap and water solution is formed and then heated to a temperature of approximately 65° C. The mixture is then beaten until it reaches a frothy consistency which will hold its body, thereby producing a low weight soap.

Bodman, U.S. Pat. No. 2,398,776, issued Apr. 23, 1946, the contents of which are herein incorporated by reference, teaches a batch method of producing an aerated soap. In this method, molten soap is introduced under pressure into a Banbury mixer having rotating spiral blades. The action of the blades upon the pressurized soap causes air to be evenly dispersed throughout. After the soap is thoroughly aerated, it is released into a form-imparting means, from which the solidified mass can be removed and cut into cakes or bars.

Marshall, U.S. Pat. No. 2,494,891, issued Jan. 17, 1950, the contents of which are herein incorporated by reference, teaches a method and apparatus for making floating soap. In this method, a milled soap mass is plodded and extruded into very fine diameter threads while regulating air pressure. The shredded soap mass is then compacted progressively so as to become hard without allowing the escape of occluded air.

Dupuis, U.S. Pat. No. 3,413,230, issued Nov. 26, 1958, the contents of which are herein incorporated by reference, describes a method in which a hollow body containing entrapped air is placed within the soap bar so as to cause the entire bar to float.

Susuki, et al., U.S. Pat. No. 3,649,545, issued Mar. 14, 1972, the contents of which are herein incorporated by reference, teach a synthetic detergent mass and method of manufacture. The detergent can be made to float by using hollow areas within the detergent mass or by using a foaming agent generated within the slurry, i.e., a chemically induced gas.

Another object of this invention is to provide a method of processing a soap or soap-like material without the milling required in the production of high quality hard soaps. In brief, milling involves extruding or comminuting "kettle soap" which has previously been cooled. The diminutive pieces of cool kettle soap are then compressed to form a hard soap. By mixing and cooling the soap, in sequence or concurrently, the subject invention eliminates milling.

Of general interest is a series of patents to Clarke, et al. (U.S. Pat. Nos. 4,479,884, 4,517,107, 4,680,132, issued Oct. 30, 1984, May 14, 1985 and Jul. 14, 1987, respectively), the contents of which are herein incorporated by reference, which teach detergent bars and methods for making the same. In the Clarke, et al. methodology, material is forced through a mixer which moves the material through cavities alternately on opposing faces of the stator and rotor. Although floating soap is not produced by this process, these patents illustrate mixer technology in the extended field of soap production.

Objects of this application include providing a method and system for processing soap and soap-like materials. Further objects include producing a floating soap, and in particular a soap having a white color, and minimizing loss of expensive fragrance. It is therefore a feature of the subject invention to provide a continuous flow system and a further feature to use injected gas to facilitate gas incorporation to form a floating soap. Yet another feature is the use of a closed system.

Through these objects and features, the subject invention offers the advantages of eliminating the need for milling, providing a floating soap having uniform gas distribution, creating a floating soap having a white color without the use of dyes or oxidants, minimizing the loss of volatiles (such as fragrances) and affording a rapid and continuous method for manufacturing high quality soap.

SUMMARY OF THE INVENTION

The subject invention provides a continuous flow method for processing soap, which includes providing soap heated to a pliable consistency, mixing the soap to homogeneity, cooling the soap and extruding the soap.

A system for continuously processing soap is also provided. The system features means for providing soap heated to a pliable consistency, means for mixing the soap, means for cooling the soap and an extruder coupled to the means for mixing and cooling the heated soap.

Further disclosed is a system for producing floating soap. This encompasses a source of soap heated to a pliable consistency, a first conduit connected to the soap source and adapted to be further inputted with a gas, a continuous mixer having an input in communication with the first conduit and an output, a second conduit in communication with the output of the continuous mixer, and a continuous heat exchanger having an input in communication with the second conduit and an output.

DETAILED DESCRIPTION OF THE INVENTION

The subject invention will now be described in terms of its preferred embodiments. These embodiments and specific examples are set forth to aid in the understanding of the subject invention, but are not to be construed as limiting. To provide a coherent description, the subject method and system will be discussed simultaneously.

Throughout the subject patent application, the term "soap" is used. Soap, as used throughout the application, encompasses not only soap, but also includes any soap-like material, including but not limited to, soaps, detergents, cleansing creams, and combinations thereof.

Figure 1:
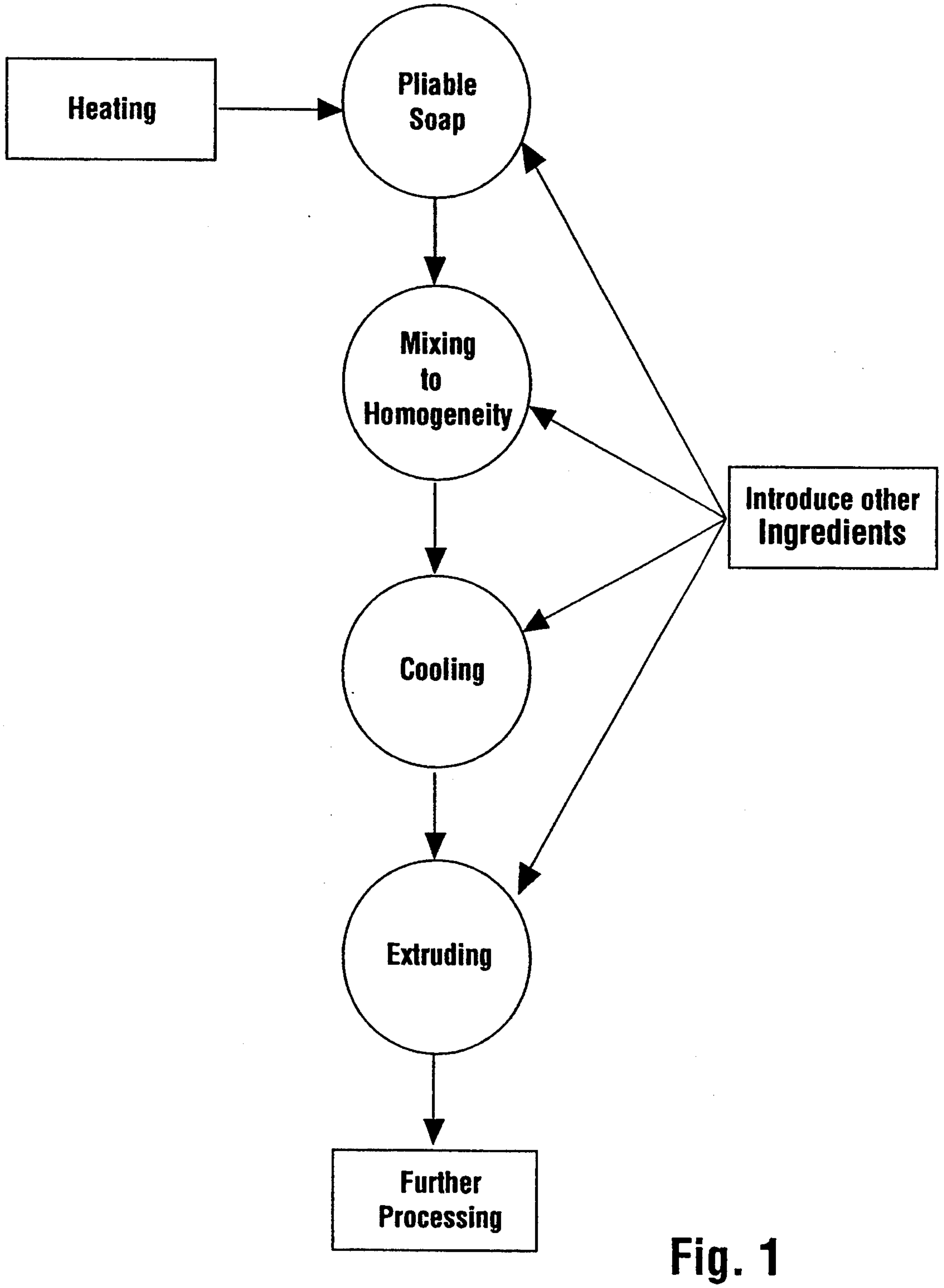
FIG. 1 is flow block diagram of the subject method.

To provide a general understanding of the subject method and system, it is helpful to follow the flow of soap. FIG. 1 is a block process diagram depicting the flow of soap in the overall most preferred embodiment for processing soap. Steps essential to all embodiments are depicted as circles; rectangles depict optional steps. As will become apparent, only certain core steps are essential to the processing of both floating and non-floating soap.

In the processing of both floating and non-floating soap it is essential to provide a pliable form of soap. Although "pliable" is a subjective term, it is readily determinable based on the equipment employed. Currently, viscosities of up to 1,000,000 centipoise or more are considered pliable, however, it is envisioned that even higher viscosities will be pliable when using heavier duty equipment.

Pliable soap typically takes the form of kettle soap which is provided at a temperature of about 170° F. Kettle soap is a neat soap precursor to milled soaps.

Figure 2:
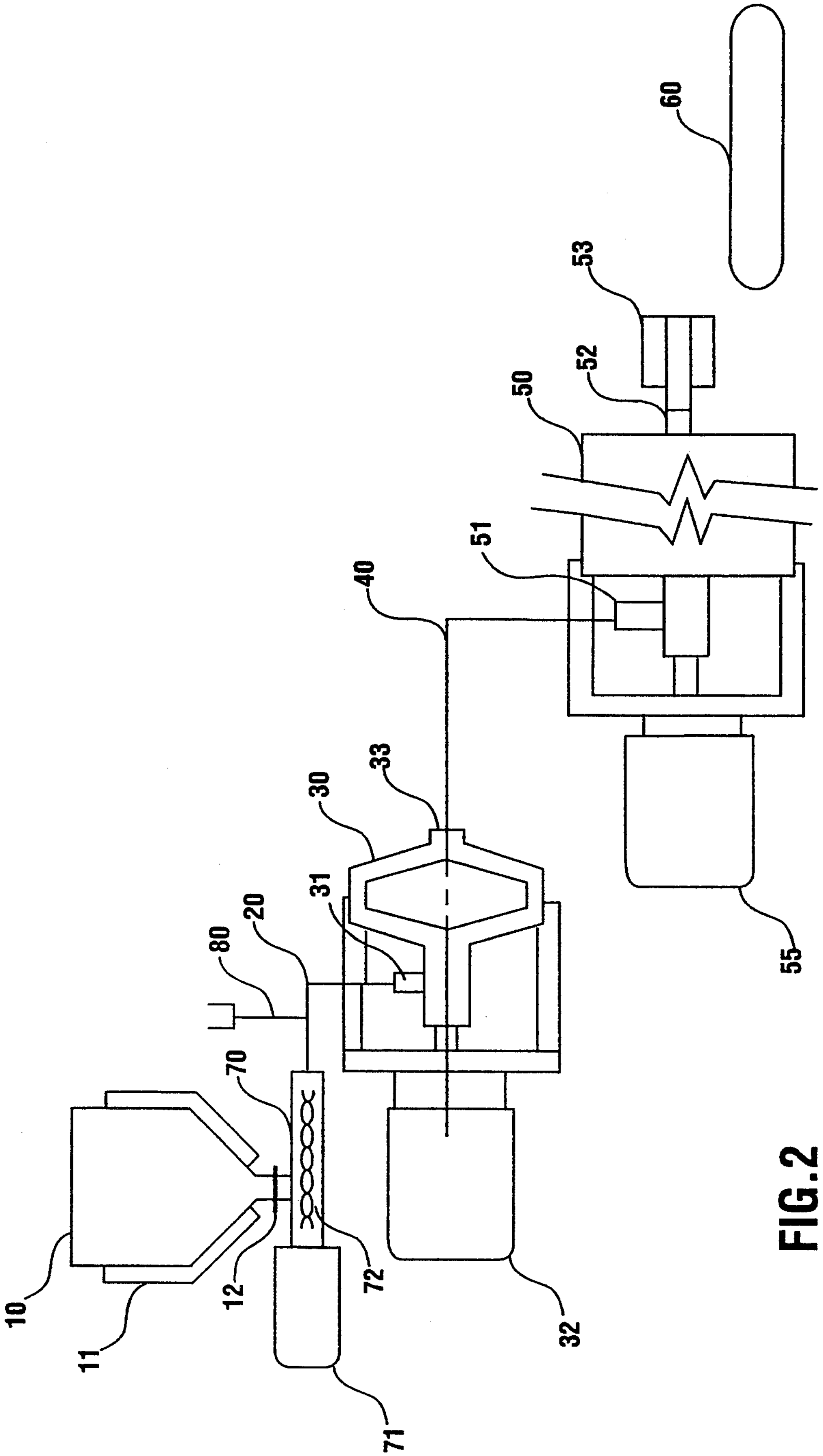
FIG. 2 is a schematic diagram of an embodiment of the subject invention.

Turning to FIG. 2, soap is introduced via a source (10), such as a soap kettle, which may either warm and/or maintain the soap at a given temperature. The soap then typically passes through a first conduit (20). Here, among other places, gas (normally under pressure) may be introduced. From the first conduit (20), the soap flows into a continuous mixer (30) and then through a second conduit (40) which leads to a scraped surface continuous heat exchanger (50). Alternatively, a scraped surface heat exchanger (50) can be used without a continuous mixer (see FIG. 3). Formed soap exiting heat exchanger (50), typically via nozzle (53), may be transported for further cooling and/or processing on conveyor (60).

Soap processing begins with the introduction of soap via a source (10). The source is often a heating device. The term "heating device" includes both devices capable of heating soap and devices capable of regulating the temperature of preheated soap. Typically, these devices take the form of a soap kettle which is heated to a given temperature. However, other devices including, but not limited to, mantles, vats, heat exchangers and the like, may be employed. Optimally, an insulated heating jacket (11) surrounds the soap kettle.

The subject method typically introduces soap heated to a pliable consistency. The precise temperature range for such heating will vary depending on a number of factors including flow rate, output, size and design of system components, and the type of soap being utilized. Normally, this temperature is below the boiling point of the soap. In the case of floating soaps this is especially relevant since soaps heated above a certain temperature will not hold a sufficient volume of gas. Under typical conditions, using a soap containing from a 75:25 to 85:15 ratio of tallow to coconut oil and about 20–33% by weight moisture, a temperature range of from about 140° F. to about 212° F. has been found satisfactory. More preferably, temperature is of from about 170° F. to about 190° F., with an optimal temperature of about 175° F.

To insure a continuous soap flow, various methodologies may be employed. For example, the flow of soap from the source (10) may be regulated to provide a constant flow from the output (12). Alternatively, source (10) may comprise a plurality of heating devices to insure a continuous flow of heated soap into first conduit (20).

Figure 3:
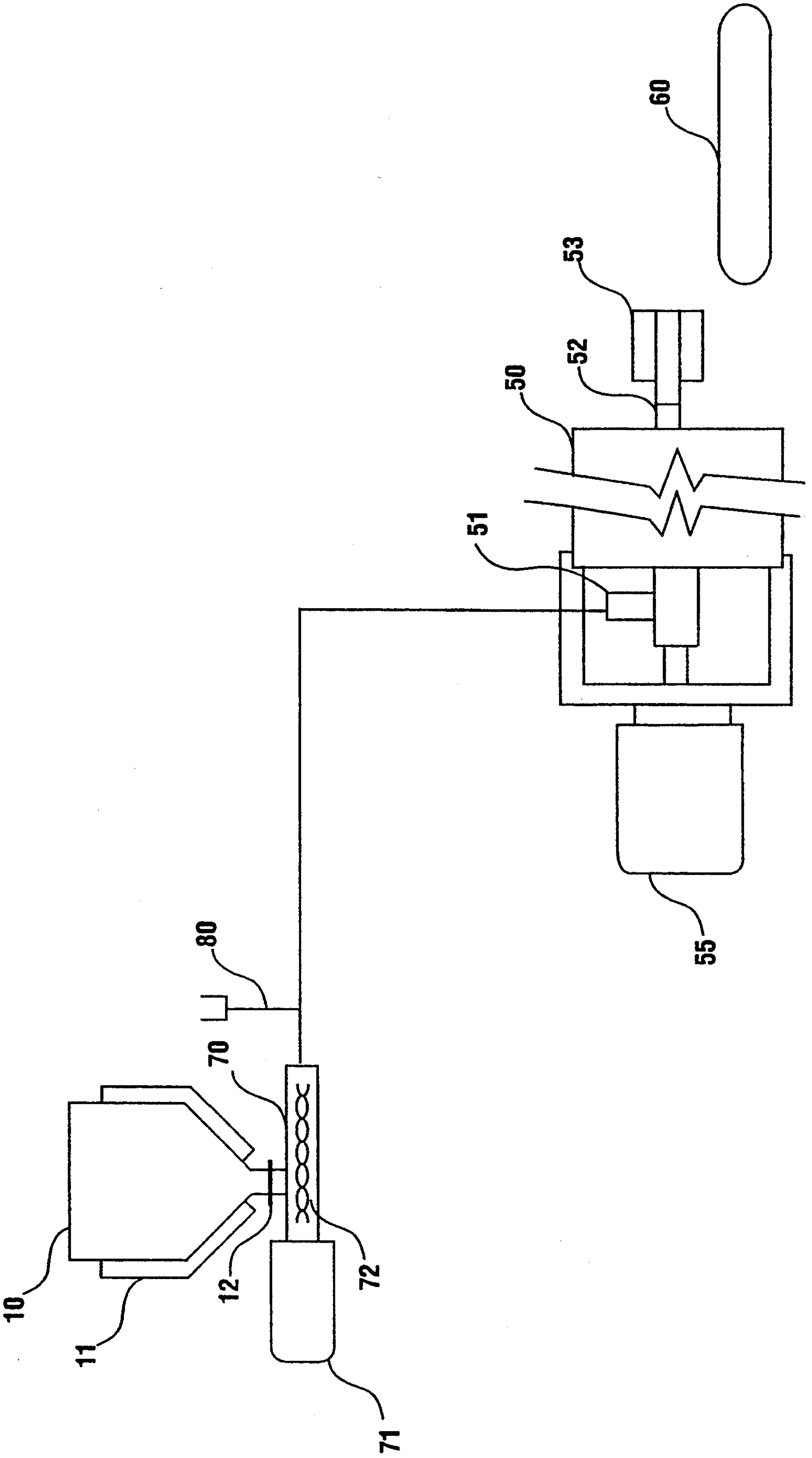
FIG. 3 is a schematic diagram of another embodiment of the subject invention.

To aid in moving soap through the system and to regulate soap flow rate, a soap pump (70), such as a Goodway Industries, Inc. Model M1, set at about 800 rpm (100 lbs/hr flow rate), may be employed. As depicted in FIGS. 2 and 3, soap pump (70) utilizes a motor (71) to rotate a rotor (72) that moves the soap from soap kettle (10) through outlet (12) and into conduit (20). The term "motor" as used herein includes any means for driving an apparatus, including but not limited to, motors, engines, servos, hydraulic systems and pneumatic systems. In situations employing a plurality of soap kettles (10), it is possible to have multiple inlets flowing into soap pump (70). Alternatively, a plurality of soap pumps (70) may be outputted into first conduit (20). The entire system is typically closed, with inputs only for soap to enter soap kettle (10), gas to enter first conduit (20) via duct (80) and a single output via outlet nozzle (53), although additional inlets may be provided for introducing other ingredients. Gas entering the system is normally applied under pressure to introduce a sufficient volume of gas into the soap. Other means for inducing gas, such as by vortex or inducer may also be employed.

Gas may be introduced into floating or non-floating soap if desired. Even minimal amounts of gas (e.g., less than that required to lower specific gravity below 1.0) may act to whiten the soap. Gas (normally compressed air, nitrogen or other inert gas) may be introduced through duct (80). As used herein, the term "duct" includes any means though which a fluid may pass. Although duct (80) is shown coupled to first conduit (20) in the figures, it is to be understood that the imput of duct (80) may be at any point in the system. Almost by definition, pressure will equal or slightly exceed that of the soap. Typically, this pressure is from about 2 psi (pounds per square inch) to about 100 psi. More preferably, the pressure is from about 10 psi to about 20 psi. The key variable is the flow rate/volume of the gas being introduced to soap. The required rate of flow is readily determined and may be regulated by a valve and/or check valve, with the rate being readily determined empirically (trial and error) or by calculation. The soap which is produced preferably has a specific gravity between 0.6 and 0.995.

First conduit (20) often serves the purposes of evacuating soap from the source (10) (typically via soap pump (70)), introducing gas via duct (80) and introducing the gas containing soap into inlet (31) of continuous mixer (30), or alternatively, directly into a continuous scraped surface heat exchanger (50). Once gas and heated soap are moved into continuous mixer (30) or heat exchanger (50), further processing can occur.

Gas and/or other ingredients may be introduced into the soap. The soft pliable soap fed into first conduit (20) from soap pump (70), can mix with the gas and enter inlet (31) of continuous mixer (30) to initiate mixing. Although the choice of continuous mixer (30) is readily determinable by one skilled in the art, it is preferred to use a continuous mixer manufactured by Goodway Industries, Inc., for example Model CM6 (typical setting 1500 rpm), CM15 or CM35. Such a continuous mixer is described in applicant's earlier patent, U.S. Pat. No. 4,092,738, issued May 30, 1978, the contents of which are herein incorporated by reference. Continuous mixer (30) may be operated by motor (32). After the soap and gas are thoroughly mixed, they exit continuous mixer (30) through outlet (33) and may flow through second conduit (40) until reaching scraped surface continuous heat exchanger (50) through inlet (51). Alternatively, aeration may occur in heat exchanger (50).

The soap, with or without gas, is cooled (concurrently or sequentially). Preferably, as with the above steps, cooling is done under pressure to maintain the gas, if present, evenly dispersed throughout the soap. In continuous heat exchanger (50), the temperature of the soap is reduced to about 100° F. to about 140° F., more preferably to about 120° F. to about 130° F. and most preferably to 125° F. As depicted, continuous scraped surface heat exchanger (50) is driven by motor (52). Soap exiting continuous heat exchanger (50) passes through output (52) into outlet nozzle (53). One preferred continuous scraped surface is Goodway Industries, Inc. Model CHE15 set at 75 rpm.

Nozzle (53) serves the purpose of dispersing the formed soap to the environment and may be of any configuration suitable to form bars of a desired shape. The shape of outlet nozzle (53) can vary, but is readily determinable by one skilled in the art of extrusion. It is most beneficial to use a converging, heated nozzle (53), since such a nozzle (53) has been found to produce a smooth extrusion. Most preferably, nozzle (53) has a plurality of heat zones, with the hottest zone being at the point of extrusion. For the soaps described above, a 200° F. nozzle temperature has been found to produce a smooth surface on the soap.

After the soap is extruded through outlet nozzle (53), it may be cut (cutting device not shown) and/or further cooled on conveyor (60). Further processing, such as embossing, sizing, shaping, stamping, cutting, etc. may be done in the same manner as conventional soap. Means for cutting, stamping, embossing, etc. the soap are readily determinable.

The subject system could be modified to be performed within a single apparatus. Such an apparatus would be capable of performing the functions of either heating or accepting preheated soap, introducing gas or other additional ingredients into the heated soap, continuously mixing the soap and continuously cooling the soap. In such a device, a single motor could be used to drive continuous mixer (30) and heat exchanger (50), i.e. replacing motors (32) and (52). Moreover, as stated above with respect to source (10), it is further envisioned that a plurality of heat exchangers, continuous mixers, soap pumps, etc. may be employed to increase efficiency.

Upon reading the subject application, alternative embodiments and variations will become apparent to those skilled in the art. These alternatives and variations are to be considered within the scope and spirit of the subject invention. The subject invention is only to be limited by the claims which follow and their equivalents.

What is claimed is:

1. Method for the preparation of soap of white color having no dyes or oxidants present therein by a continuous flow process comprising the steps of:

a) heating a soap composition in a suitable container to a temperature sufficient to yield soap of pliable consistency;

b) transporting the resultant heated soap at a constant flow rate through a conduit connecting the container with a continuous mixer, a gas having been introduced into said conduit under pressure during transport of the soap therethrough, in an amount sufficient to cause the soap to float, and mixing the heated soap gas mixture to homogeneity continuously in said mixer;

c) transporting the homogenized soap mixture through a second conduit continuously to a continuous heat exchanger wherein the mixture is cooled, and d) transporting the cooled soap mixture through a third conduit to an extruder wherein the soap is extruded continuously.

2. A method of claim 1, wherein the soap is provided at a temperature below the boiling point of the soap.

3. A method of claim 2, wherein the soap is provided at a temperature of from about 140° F. to about 212° F.

4. A method of claim 3, wherein the soap is provided at a temperature of from about 170° F. to about 190° F.

5. A method of claim 4, wherein the soap is provided at a temperature of about 175° F.

6. A method of claim 1, wherein the mixing is conducted for a sufficient time and at a sufficient intensity to produce a nongritty fine grain soap structure.

7. A method of claim 1, wherein the cooling is to a temperature of from about 100° F. to about 140° F.

8. A method of claim 7, wherein the cooling is to a temperature of from about 120° F. to about 130° F.

9. A method of claim 8, wherein the cooling is to a temperature of about 125° F.

10. A method of claim 1, wherein the extruding is at a viscosity sufficient to retain the shape of the soap.

11. A method of claim 1, wherein the extruding is conducted through a heated nozzle.

12. A method of claim 1 further comprising cooling the extruded soap.

13. A method of claim 1 further comprising cutting the extruded soap.

14. A method of claim 1 further comprising stamping the extruded soap.

15. A method of claim 1 further comprising embossing the extruded soap.

16. A method of claim 1 further comprising pumping the soap.

17. A system for the continuous preparation of soap of white color having no dyes or oxidants present therein including:

a) means for heating soap to a pliable consistency, b) first conduit means for transporting the heated soap to a continuous mixer means, said first conduit being adapted with an inlet means for the continuous introduction of gas thereto during transport of soap therethrough, said introduction of gas in an amount sufficient to cause the soap to float, c) continuous mixer means for effecting homogenization of the mixture of soap and gas, d) second conduit means for transporting the homogenized mixture to a cooling means, e) means for cooling the homogenized mixture, and f) third conduit means for transporting the cooled soap mixture, and g) means for continuously extruding the cooled soap.

18. A system of claim 17, wherein the heating device comprises a kettle.

19. A system of claim 18, wherein the kettle is jacketed.

20. A system of claim 17, wherein the continuous mixer is directly coupled to a heating kettle.

21. A system of claim 17, wherein the extruder comprises a nozzle.

22. A system of claim 21, wherein the nozzle is a converging nozzle.

23. A system of claim 21, wherein the nozzle is heated.

24. A system of claim 23, wherein the nozzle has a plurality of temperature zones.

25. A system of claim 23, wherein the nozzle is heated to a temperature of about 200° F.

* * * * *